(12) United States Patent
Blier et al.

(10) Patent No.: US 8,276,277 B2
(45) Date of Patent: Oct. 2, 2012

(54) DEVICE FOR HOLDING AND PREPARING A FOOD PRODUCT

(75) Inventors: Barry Blier, East Greenwich, RI (US); Norman Blier, East Greenwich, RI (US); Alfred Kenyon, West Warwick, RI (US)

(73) Assignee: Barry Blier, East Greenwich, RI (US)

( * ) Notice: Subject to any disclaimer, the term of this patent is extended or adjusted under 35 U.S.C. 154(b) by 392 days.

(21) Appl. No.: 12/265,076

(22) Filed: Nov. 5, 2008

(65) Prior Publication Data
US 2010/0229734 A1    Sep. 16, 2010

(51) Int. Cl.
| | |
|---|---|
| B26B 11/00 | (2006.01) |
| B26B 1/00 | (2006.01) |
| A47J 37/04 | (2006.01) |
| A47J 37/06 | (2006.01) |
| A47J 43/18 | (2006.01) |
| A01K 81/04 | (2006.01) |
| B08B 1/00 | (2006.01) |
| F41B 13/10 | (2006.01) |

(52) U.S. Cl. .............. 30/129; 99/419; 99/421 A; 294/61
(58) Field of Classification Search ............ 99/419, 99/421 A; 294/61, 100, 50, 55.5, 5; 30/129
See application file for complete search history.

(56) References Cited

U.S. PATENT DOCUMENTS

| | | | |
|---|---|---|---|
| 316,334 A | 4/1885 | Coyle | |
| 1,172,333 A | 2/1916 | Williams | |
| 2,212,013 A * | 8/1940 | Devareaux | 294/100 |
| 2,213,015 A | 8/1940 | Parent | |
| 2,420,710 A | 5/1947 | Livingston | |
| 2,500,647 A * | 3/1950 | Schulthess | 294/61 |
| 2,521,032 A | 9/1950 | Becker | |
| 2,730,802 A | 1/1956 | Ciaglia | |

(Continued)

FOREIGN PATENT DOCUMENTS

EP    0607948    1/1994

(Continued)

OTHER PUBLICATIONS

Veggie and Fruit Holder, The Wright-Stuff, Inc., http://wtore.wrightstuff.biz/vegandfruith.html.

*Primary Examiner* — Gene Kim
*Assistant Examiner* — John E Simms, Jr.
(74) *Attorney, Agent, or Firm* — Salter & Michaelson

(57) ABSTRACT

The device is for holding an edible food product such as a vegetable or piece of fruit in readiness for the preparation thereof. The device may be used for peeling or cutting vegetables or fruit in a safe manner. The device includes a body that is meant to be grasped by a user of the device and a set of prongs that are supported by the body and extend from a distal end of the body. The set of prongs preferably includes at least three prongs that are disposed in a parallel array and that are for piercing engagement with the edible product. An actuator rod assembly is supported by the body and includes a proximal end cap and a distal pusher piece that is meant to engage the edible product for dis-engagement thereof from the set of prongs. A biasing spring is disposed in the body for urging the actuator rod assembly in a proximal direction.

9 Claims, 19 Drawing Sheets

U.S. PATENT DOCUMENTS

| | | | |
|---|---|---|---|
| 2,783,535 A | 3/1957 | Cesare | |
| 2,873,522 A | 2/1959 | Homola | |
| 2,881,816 A | 4/1959 | Batt | |
| 2,912,755 A | 11/1959 | Twyman | |
| 4,126,086 A * | 11/1978 | Valade | 99/419 |
| 4,163,575 A * | 8/1979 | Riedinger et al. | 294/5 |
| 4,338,721 A * | 7/1982 | Cauchon et al. | 30/322 |
| 4,422,620 A * | 12/1983 | Nitzberg | 254/26 E |
| 4,744,791 A * | 5/1988 | Egolf | 604/229 |
| 5,154,116 A * | 10/1992 | Dube | 99/403 |
| 5,495,794 A | 3/1996 | Ulysse | |
| 5,642,911 A * | 7/1997 | Gatch | 294/61 |
| 6,199,283 B1 | 3/2001 | Bryant | |
| 6,408,520 B1 | 6/2002 | Ridler | |
| 6,659,522 B2 | 12/2003 | Byth | |
| D575,592 S * | 8/2008 | Lion et al. | D7/637 |
| 2002/0073853 A1* | 6/2002 | Norcross | 99/342 |
| 2006/0196055 A1 | 9/2006 | Barcala | |

FOREIGN PATENT DOCUMENTS

JP 2003169747 6/2003

* cited by examiner

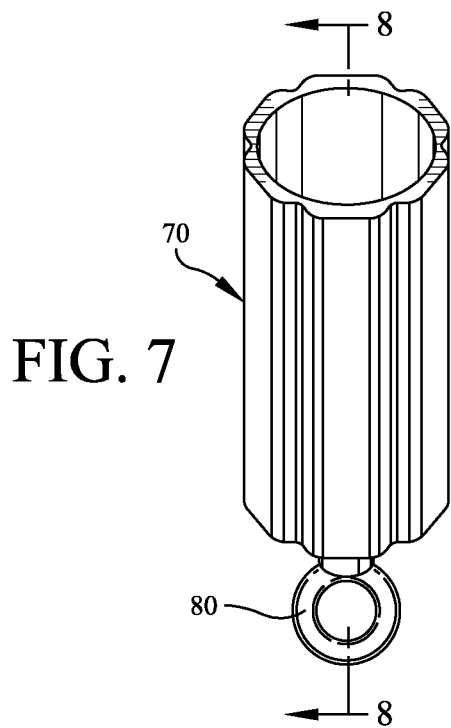
FIG. 7
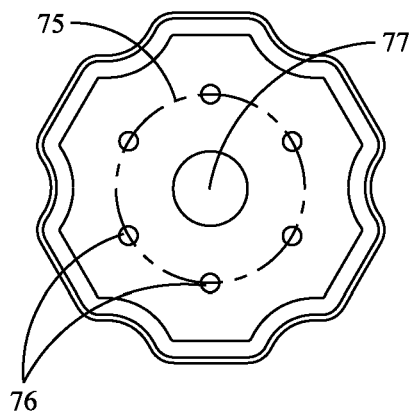
FIG. 9
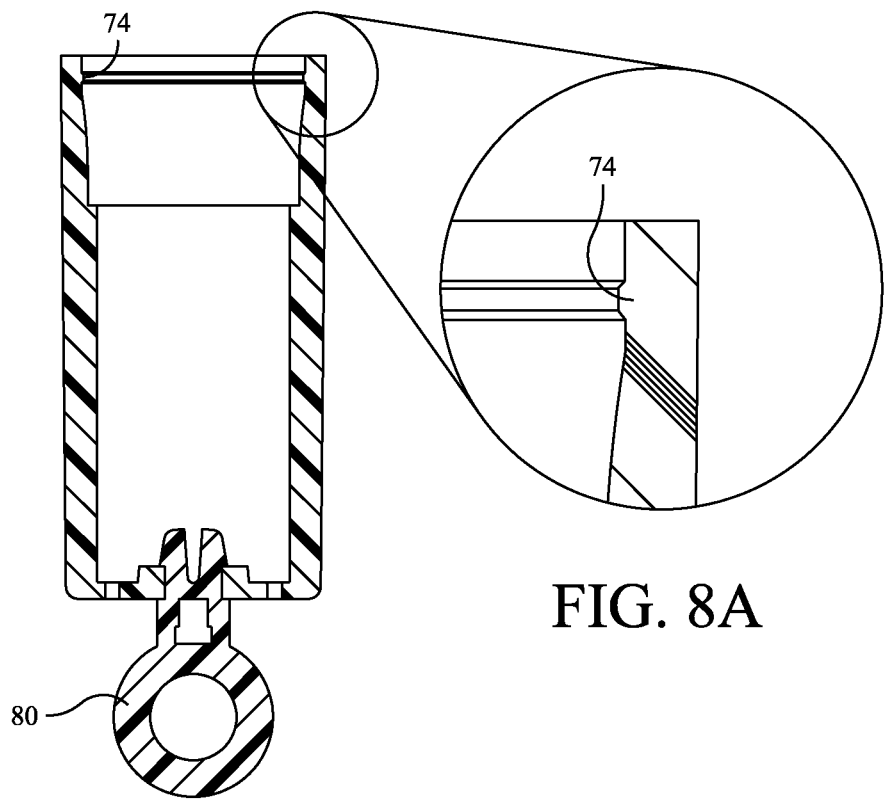
FIG. 8
FIG. 8A

DEVICE FOR HOLDING AND PREPARING A FOOD PRODUCT

FIELD OF THE INVENTION

The present invention relates in general to a device for holding and preparing an edible food product. More particularly, the present invention relates to a device of simple construction and one that effectively holds vegetables or fruit for peeling, cutting or slicing.

BACKGROUND OF THE INVENTION

In the prior art there are a number of cutting mechanisms that are utilized in the culinary arts to aid in the preparation of comestible products. These devices are utilized to cut, shred, peel or otherwise prepare fruit and vegetables for serving or for cooking. Often this preparation process includes peeling, at a minimum, as many fruit and vegetables must be prepared for serving or cooking by removing or cutting the outer peeling or skin therefrom.

Over the years, it has been the predominate practice to peel fruit and vegetables by holding them by hand and using a hand held peeling device to remove the outer skin of the fruit or vegetable. Such techniques and devices are not only slow and tedious to use but also require a great deal of physical effort to be exerted when preparing such foods. In addition, hand held slicing, peeling and cutting implements are inherently dangerous in that a user must hold the vegetable or fruit, which may be wet and/or slippery, while wielding a sharp blade in close proximity to their hand in order to remove the peel or skin from what is usually an irregular surface of the food product. In addition, in such applications, the user's hands often get dirty from holding the vegetable while in the process of peeling.

In an attempt to make the preparation of foods such as fruits and vegetables less labor intensive and safer, various machines have been designed for use in the kitchen for use in removing the peelings from fruits and vegetables such as countertop mounted devices that include rotors and numerous cutting elements that support and turn a fruit or vegetable against a knife blade for the purpose of removing the peel. The difficulty is that such devices are often large and cumbersome and require counter and storage space. Furthermore, while they have a gimmicky appeal, they are inefficient and generally require more effort for set-up and cleaning than the device produces in the time saved in peeling the food product.

The prior art also shows several fork type devices some with ejectors. By way of example reference is made to U.S. Pat. No. 2,420,710 to Livingston; U.S. Pat. No. 2,881,816 to Batt; and U.S. Pat. No. 5,495,794 to Ulysse. These devices also tend to be quite cumbersome and difficult to use. Moreover, these prior art devices do not adequately hold the piece of fruit or vegetable. Furthermore, these existing devices do not provide a ready means for disengaging the piece of fruit or vegetable from the device, i.e., after peeling, slicing or cutting.

Accordingly, it is an object of the present invention to provide an improved device for holding an edible food product such as a vegetable or fruit and in readiness for the preparation thereof.

Another object of the present invention is to provide an improved device for holding and preparing a food product in which the fruit or vegetable is held in a safe manner. The device of the present invention is in particular constructed and arranged so that any cutting implement used with the device of the present invention is not to be used adjacent or close to the hand of the user.

Still another object of the present invention is to provide an improved device for holding and preparing a food product, particularly fruit or vegetables and in which the edible product is retained easily, effectively and affirmatively so that the peeling, cutting or slicing can be readily performed.

SUMMARY OF THE INVENTION

To accomplish the foregoing and other objects, features and advantages of the present invention there is provided a device for holding an edible food product in readiness for the preparation thereof. The device is particularly described as a device for holding and peeling or cutting vegetables or fruit. The device comprises a body that is meant to be grasped by a user of the device and a set of prongs that are supported by the body and extend from a distal end of the body. The set of prongs includes at least three prongs that are disposed in a parallel array and that are for piercing engagement with the edible product. An actuator rod assembly or ejector mechanism is supported by the body and includes a proximal end cap and a distal pusher piece that is meant to engage the edible product for dis-engagement thereof from the set of prongs. The distal pusher piece is arranged within a locus area defined by the position of the set of prongs. A biasing spring is disposed in the body for normally urging the actuator rod assembly in a proximal direction.

In accordance with other aspects of the present invention interlock keying means may be disposed between the actuator rod assembly and the body so that the motion therebetween is limited to only linear relative motion; the keying means may inhibit relative rotation of the actuator rod assembly relative to the body; an eye ring may be disposed adjacent the proximal end cap and provided as a means to assist in operating the actuator rod assembly; the eye ring may be removably attached about an actuator rod of the actuator rod assembly; the eye ring preferably includes a circular ring and an attachment tab that is integral with the circular ring but disposed offset from the outer surface of the circular ring so as to accommodate different size hands using the device; each of the prongs of the set of prongs may have a pointed end and a series of spacedly disposed engagement rings about the prong to assist in holding the edible product to the prongs; the distal end of the body is preferably circular having an annular surface from which the set of prongs extend and the at least three prongs are arranged in a triangular pattern extending equally spaced from and about the annular surface and a cover may be used that fits over the set of prongs and fits with the distal end of the body.

Another embodiment of the present invention involves a device for holding an edible product such as a vegetable or fruit in readiness for the preparation thereof, such as for the peeling or slicing thereof. The device comprises an elongated body that is meant to be grasped by a user of the device and held in the hand of the user; the elongated body having proximal and distal ends with the elongated body for holding at the proximal end thereof, the elongated body further having means defining an elongated and centrally dispose passage extending therethrough from the proximal end to the distal end thereof, a set of prongs, each having a pointed end, supported by the elongated body, extending from the distal end of the elongated body and fixed in position relative to the elongated body; the set of prongs including at least three prongs that are disposed in a parallel array and that are for piercing engagement with the edible product; adjacent pairs of the at least three prongs constructed and arranged to be disposed in respective predetermined planes that intersect so as to form a multi-sided area therebetween; an actuator rod assembly or ejector mechanism supported by the elongated body, disposed in the centrally disposed passage in the elongated body and having proximal and distal ends; the actuator rod assembly including a proximal end, a distal end and an actuator rod disposed between the proximal and distal ends; a proximal end cap arranged at the proximal end of the actuator rod assembly and meant for manual engagement to operate the actuator rod; a distal pusher piece arranged at the distal end of the actuator rod assembly and meant to engage the edible product within the multi-sided area for dis-engagement of the edible product from the set of prongs; the distal end of the elongated body having a recess for receiving the distal pusher piece therein; and a biasing spring disposed in the centrally disposed passage of the elongated body, about the actuator rod and normally biased for urging the actuator rod assembly in a proximal direction wherein the distal pusher piece is held in the recess at the distal end of the elongated body.

In accordance with still other aspects of the present invention means are provided for permitting linear translation of the actuator rod while inhibiting rotation between actuator rod and elongated body; the means for inhibiting rotation may include interlock keying means between the actuator rod assembly and the elongated body so that the motion therebetween is limited to only linear relative motion; the interlock keying means may include at least one key on the actuator rod and a corresponding at least one slot in the centrally disposed passage in the elongated body; an eye ring may be disposed adjacent the proximal end cap and provided as a means to assist in operating the actuator rod assembly; the eye ring is preferably removably attached about an actuator rod of the actuator rod assembly and can assume two separate positions; the eye ring preferably includes a circular ring and an attachment tab that is integral with the circular ring but disposed offset from the outer surface of the circular ring so as to accommodate different size hands using the device; each of the prongs of the set of prongs may have a pointed end and as opposite end imbedded in the distal end of the elongated body and a series of spacedly disposed engagement rings about the prong to assist in holding the edible product to the prongs; the distal end of the body is preferably circular having an annular surface from which the set of prongs extend and the at least three prongs are arranged in a triangular pattern extending equally spaced from and about the annular surface; a cover is preferably provided that fits over the set of prongs and fits with the distal end of the elongated body; the device is preferably provided in combination with a base that supports the cover when the cover is engaged with the distal end of the elongated body.

DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which:

FIG. 7 is a perspective view of the cover alone;

FIG. 8 is a cross-sectional view through the cover and taken along line 8-8 of FIG. 7;

FIG. 8A is a partial enlarged view at one end of the cover showing a detent;

FIG. 9 is an end view of the cover of FIG. 7;

DETAILED DESCRIPTION

Figure 1:
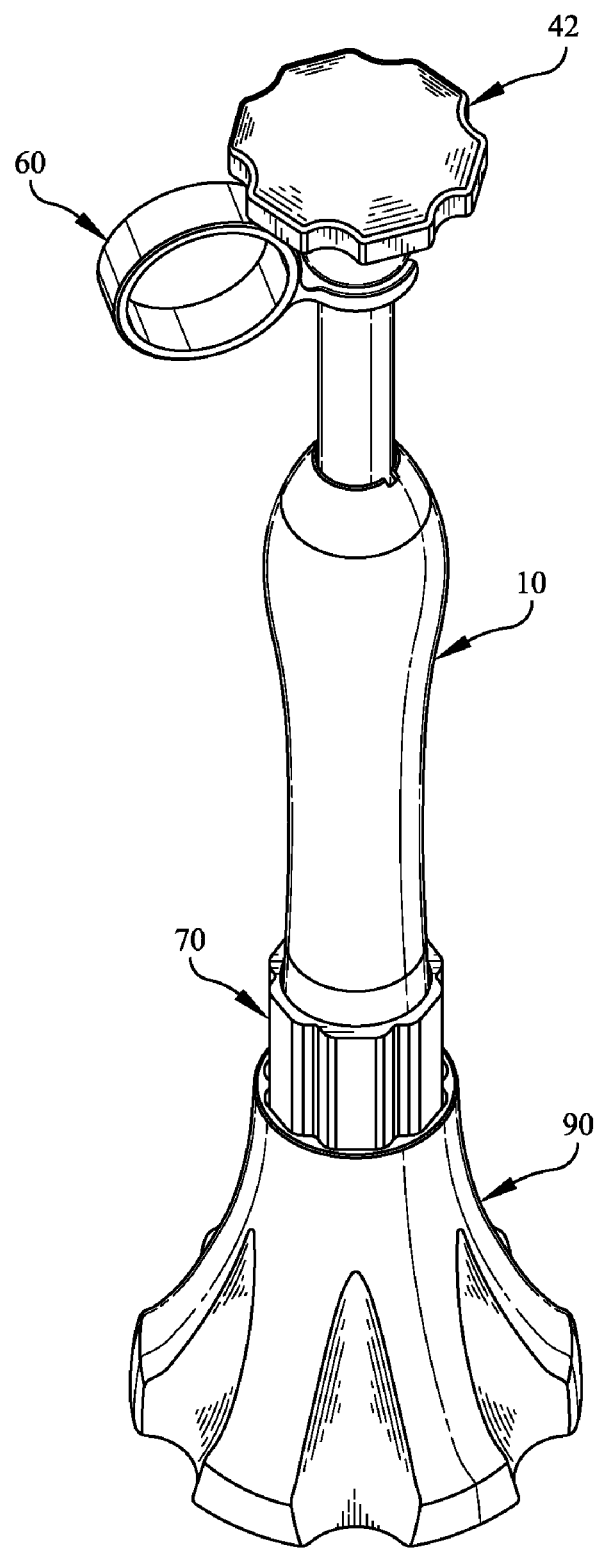
FIG. 1 is a perspective view of a preferred embodiment of the device of the present invention including the base and cover.

In accordance with the present invention a device is provided that is configured to receive and retain a fruit or vegetable in a stabilized manner that allows the user to firmly hold the food while removing the outer skin or peel. Principally, the device includes a gripping handle with a proximal end and a distal end, prongs for receiving and retaining the food article extending from the distal end and an ejector mechanism that extends through the handle and is actuated from the proximal end in order to discharge the food from the prongs once the peeling, cutting or slicing process is completed.

The handle member may be formed from any suitable material that is compatible for contacting food. The handle may be formed from wood, molded plastic or metal, and is preferably elongated so that the food is away from the handle for safety purposes. The handle is formed to provide a place for a user to firmly grip the device and may include surface enhancements such as knurling, knobs, rings or other texturing to enhance the grip of the user. The handle is configured such that prongs extend outwardly from the distal end thereof for the purpose of receiving and retaining the desired food product. Further, the handle has a central passage extending therethrough to receive the ejector mechanism as will be described in more detail below.

The prongs that extend outwardly from the distal end of the handle may be of any suitable material capable of food contact. They may be metallic, plastic or wood. The prongs are rigid and configured to pierce and penetrate the food item to be peeled or prepared. While in the preferred embodiment, three prongs are shown, the present invention anticipates that at least two prongs are provided to properly stabilize and retain the food produce. Three prongs are desired as that provides a better grasp of the food product. Also, preferably the prongs are arranged out of the same plane, as illustrated and described further below.

The ejector assembly includes a rod that extends through the passage in the handle, and at the end of the rod adjacent the prongs, there is provided a pusher device installed thereon. At the end of the rod adjacent the rear of the handle, there is a knob or cap installed thereon. In addition, the ejector mechanism is spring biased to an inactive or rest position, where the pusher device is retracted fully against the distal end of the handle until the knob is again depressed to initiate the ejection phase.

Reference is now made to a preferred embodiment of the present invention described in the accompanying drawings. FIGS. 1-19 show the details of the device, while FIGS. 20-23 show a typical series of steps that are taken in using the device of the present invention. The device shown herein includes, not only the basic peeling device, but also a cover 70 for covering the prong end of the device, and a base 90 for supporting the device in an upright manner. The following description describes a device for holding an edible product such as a vegetable or fruit in readiness for the preparation thereof. For illustration purposes in FIGS. 20-23 an apple is illustrated as being peeled. However, the device of the present invention may be used for many different steps used in the preparation of food other than just the peeling step. The preparation may include, but is not limited to, such steps as peeling, cutting, slicing or other steps used in the preparation of food products. Examples of food products that may be used with the device of the present invention include, but are not limited to, potatoes, carrots, celery, apples and oranges.

Figure 14:
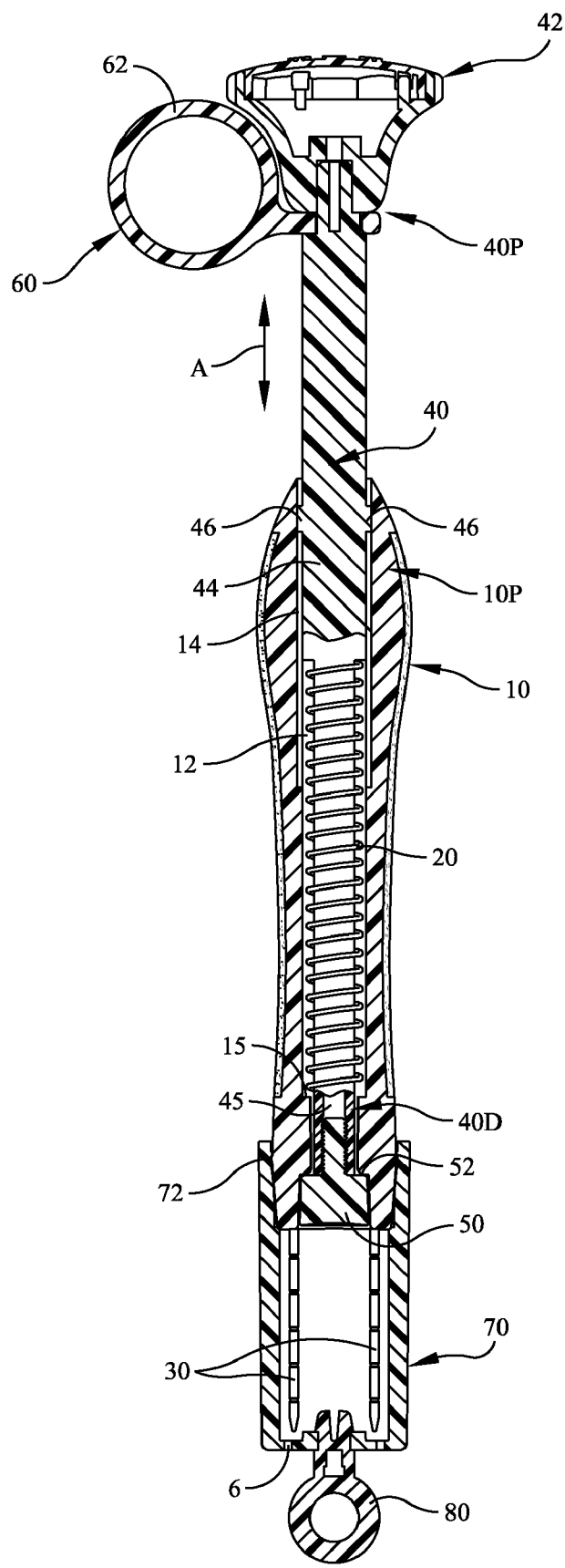
FIG. 14 is a longitudinal view of the complete device with the cover attached.
Figure 20:
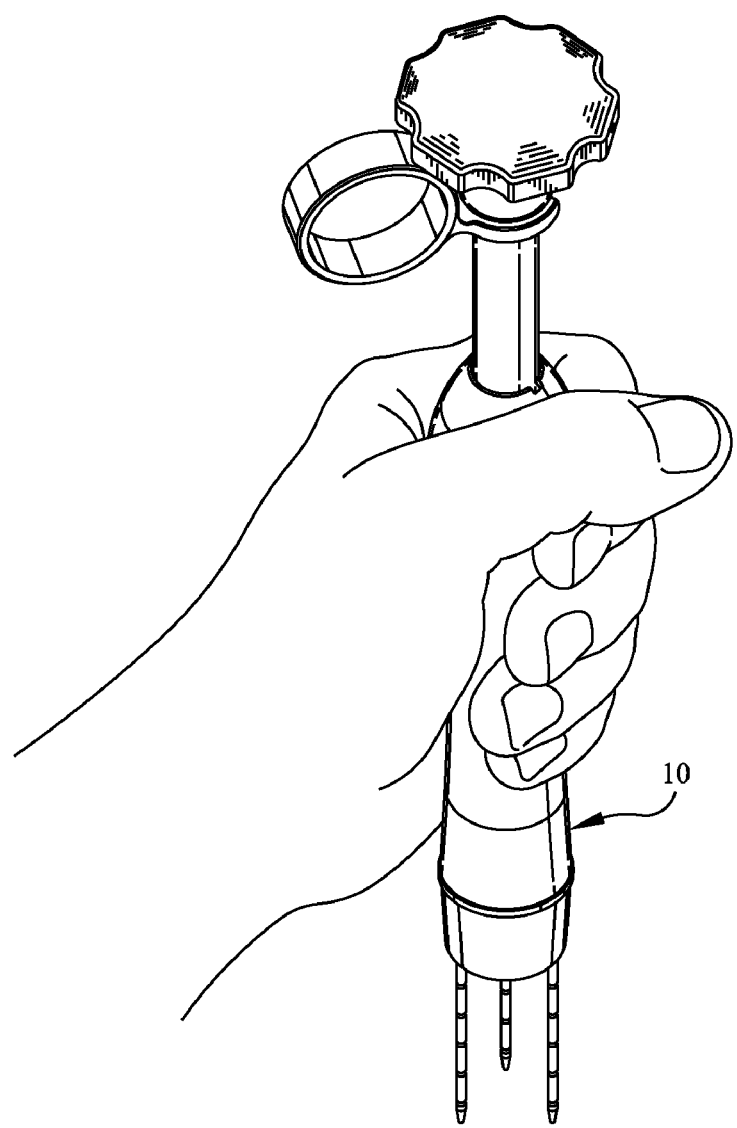
FIG. 20 is a perspective view illustrating a first step in using the device of the present invention where the user is grasping the device in readiness for piercing an apple.
Figure 20:
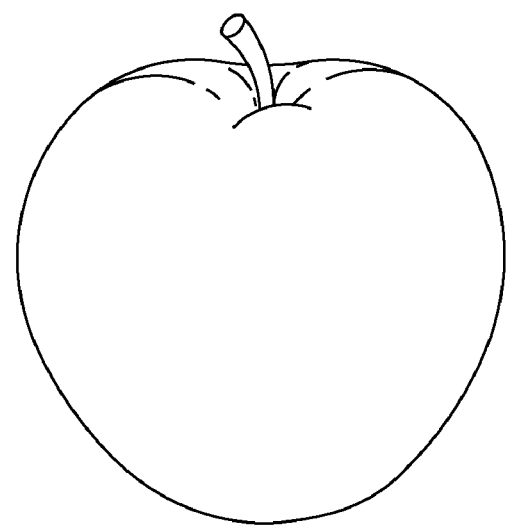

The device or implement comprises an elongated body 10 that may be considered as having a longitudinal center line, such as a vertical line taken symmetrically through the ejector mechanism in FIG. 14. The elongated body 10 has a proximal end 10P and a distal end 10D. The body or handle 10 is meant for grasping by the user more toward the proximal end 10P thereof, as is illustrated in FIG. 20. The elongated body 10 is generally of cylindrical shape but is contoured as illustrated in the drawings with a bulbous portion at the proximal end, as illustrated. The cross-section becomes smaller near the middle of the elongated body and may be slightly larger in diameter at the distal end. The elongated body 10 is preferably constructed of a plastic material. The elongated body 10 further has means defining an elongated and centrally disposed passage 12. Toward the proximal end of the body 10 the passage 12 is also provided with opposed slots 14 that are instrumental in association with the ejector mechanism to inhibit rotation of the injector mechanism relatively to the elongated body 10. The passage 12 and slots 14 are illustrated, for example, in FIG. 10.

Adjacent to the distal end 10D of the elongated body 10, there is provided a shoulder 15. The shoulder 15 functions as a rest for one end of the coil spring 20. The distal end 10D of the elongated body 10 is also formed with an annular end surface 16. The prongs 30 are embedded in the distal end 10D and extend from the annular surface 16. The distal end 10D of the elongated body 10 also is provided with a further shoulder 17 that defines a recess for receiving the distal pusher piece 50 which is described in further detail hereinafter. This pusher piece is used to contact the food product for displacing or disengaging the food product from the prongs 30.

Figure 11:
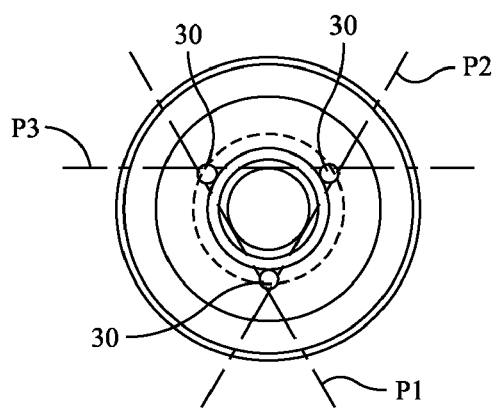
FIG. 11 is an end view of the device looking at the prongs.

Each of the prongs 30 has a pointed end 31 and preferably a series of spaced apart ring-like grooves 33 that assist in holding the product in place. These prongs 30 are supported from the distal end of the elongated body 10 and are fixed in position. Essentially, the base end of each of the prongs 30 is embedded within the distal end 10D of the elongated body 10. The set of prongs disclosed herein include three prongs that are disposed in a parallel array and that together form a piercing means for engagement with the fruit or vegetable. Adjacent pairs of the three prongs are constructed and arranged to be disposed in respective predetermined planes such as the illustrated planes P1, P2 and P3. These planes P1, P2 and P3 intersect and form a multi-sided area therebetween, as illustrated in FIG. 11. For the case of using three prongs 30, this area is triangular with the prongs 30 equally spaced about the annular surface 16. This particular pattern of prongs provides an enhanced grasping of the food product particularly in comparison with an arrangement where all of the prongs would be in a single plane. In an alternate embodiment of the invention, four prongs may be employed. These prongs would also be evenly spaced about the annular surface 16 and would define therebetween four planes forming an inner square or rectangular area rather than the triangular area described herein.

Figure 12:
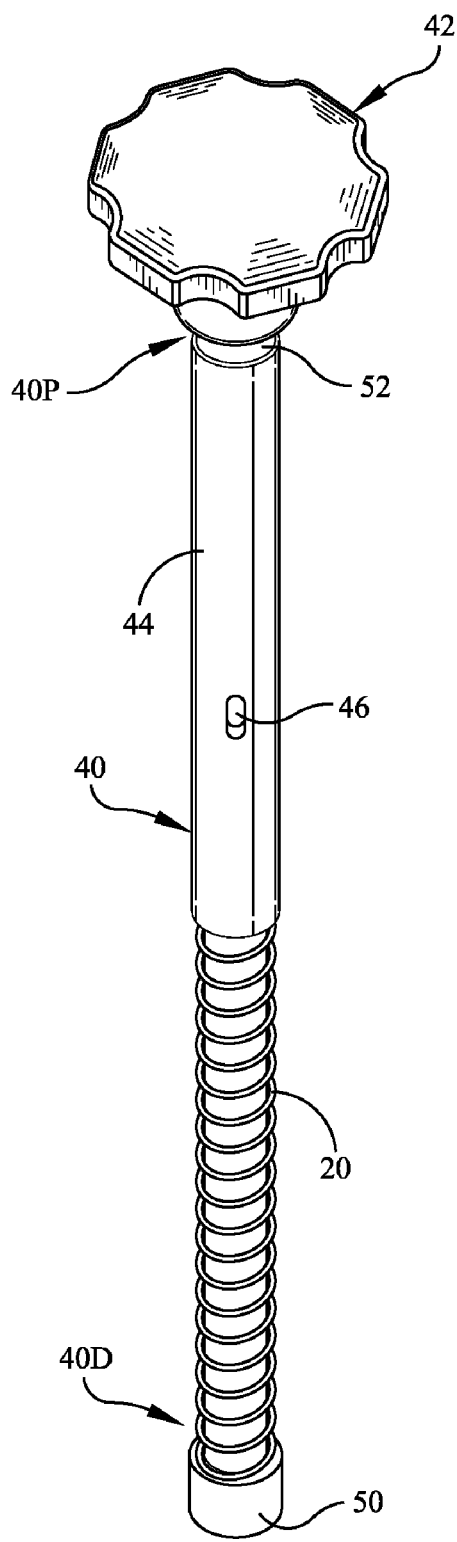
FIG. 12 is a perspective view of the ejector mechanism the device.
Figure 13:
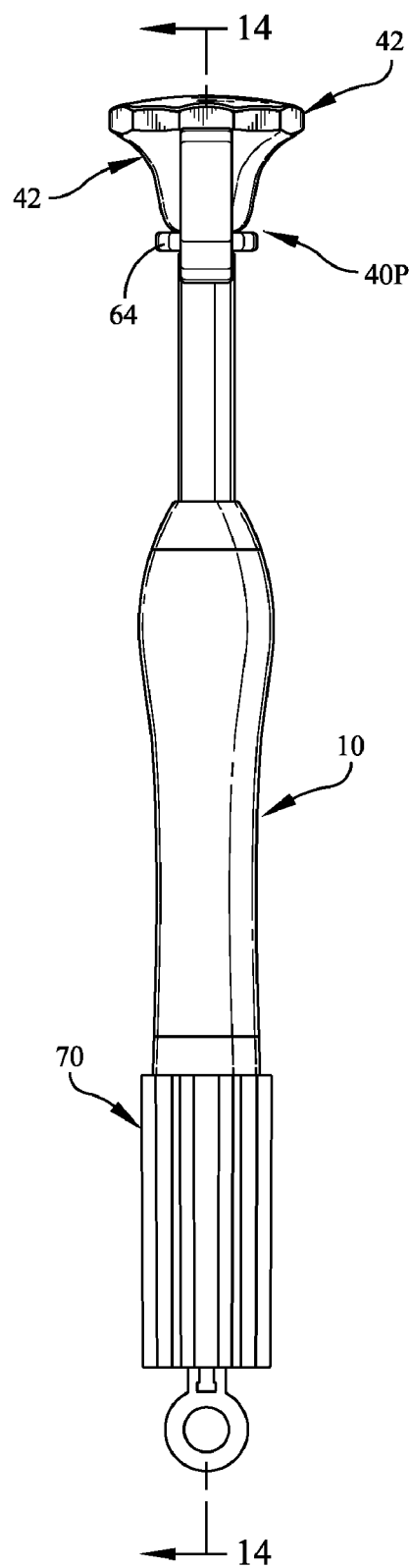
FIG. 13 is a side elevation view of the device with the cover attached to the device.

The device of the present invention also includes an ejector mechanism 40 that is shown separately in FIG. 12, and in the body in FIG. 14. The ejector mechanism 40 is supported by the elongated body 10, is disposed in the centrally disposed passage 12 in the elongated body 10 and has a proximal end 40P and a distal end 40D. A proximal end cap 42 is permanently affixed at the proximal end of the ejector mechanism 40. The end cap 42 is meant for manual engagement to operate the ejector mechanism. The ejector mechanism 40 includes an actuator rod 44 that intercouples the proximal and distal ends. The distal end 40D of the ejector mechanism is provided with a blind hole 45. The hole 45 is preferably provided with internal threads for receiving the distal pusher piece 50. Once the distal pusher piece 50 is engaged with the actuator rod then the pusher piece 50 is engaged against the shoulder 52. The head of the pusher piece 50 fits within the recess defined at the shoulder 52.

The actuator rod 40 also has diametrically disposed keys 46 that are adapted to engage in the respective elongated slots 14 in the elongated body 10. By this interlock of the key 46 with the slot 14, this prevents relative rotation between the actuator rod 44 and the elongated body 10. This key and slot arrangement thus limits the motion between the ejector mechanism and the body to only linear translation in the direction of arrow A in FIG. 14. The rod 40 is also provided with a shoulder 47 that provides a seat for the other end of the spring 20. The spring 20 normally biases the rod 44 in a proximal direction. This action retains the distal pusher piece 50 in its recessed position allowing the full length of the prongs 30 to engage with the food product.

The spring 20 is a coil spring that is dimensioned so as to be disposed in the passage 12 in the elongated body. The spring 20 is disposed about the actuator rod, engages the shoulder 47 of the actuator rod at one end and at the other end of the spring it engages the shoulder 15 of the elongated body 10.

Figure 5:
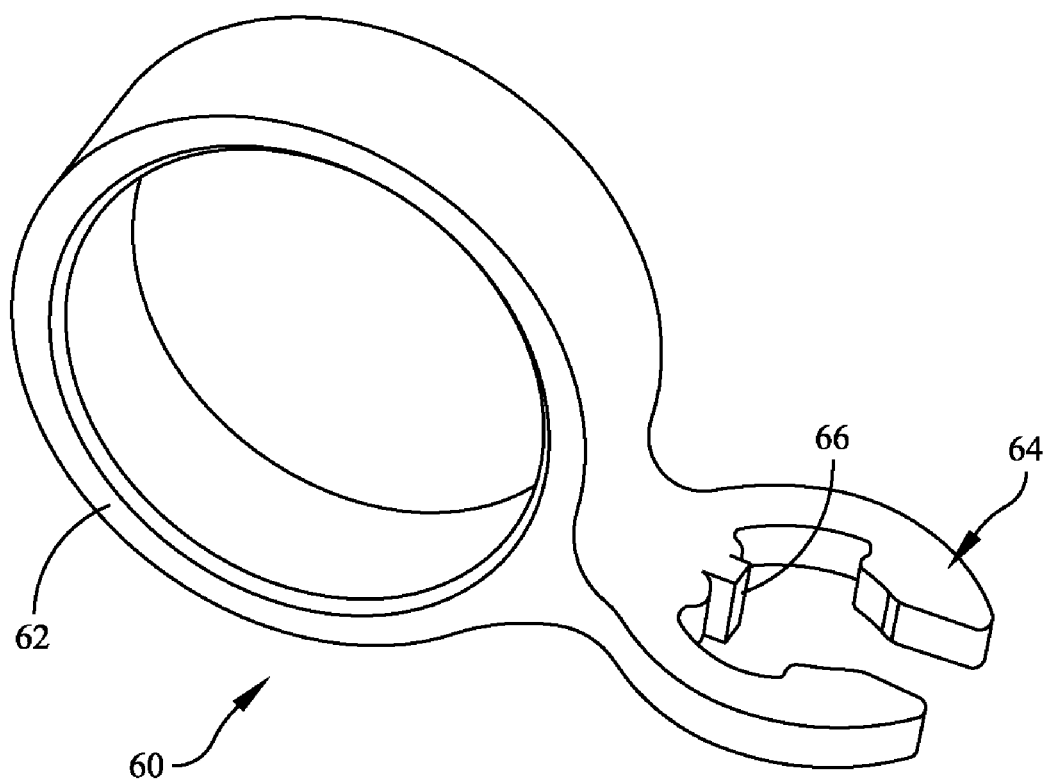
FIG. 5 is a perspective view of the eye-ring used with the device.
Figure 15:
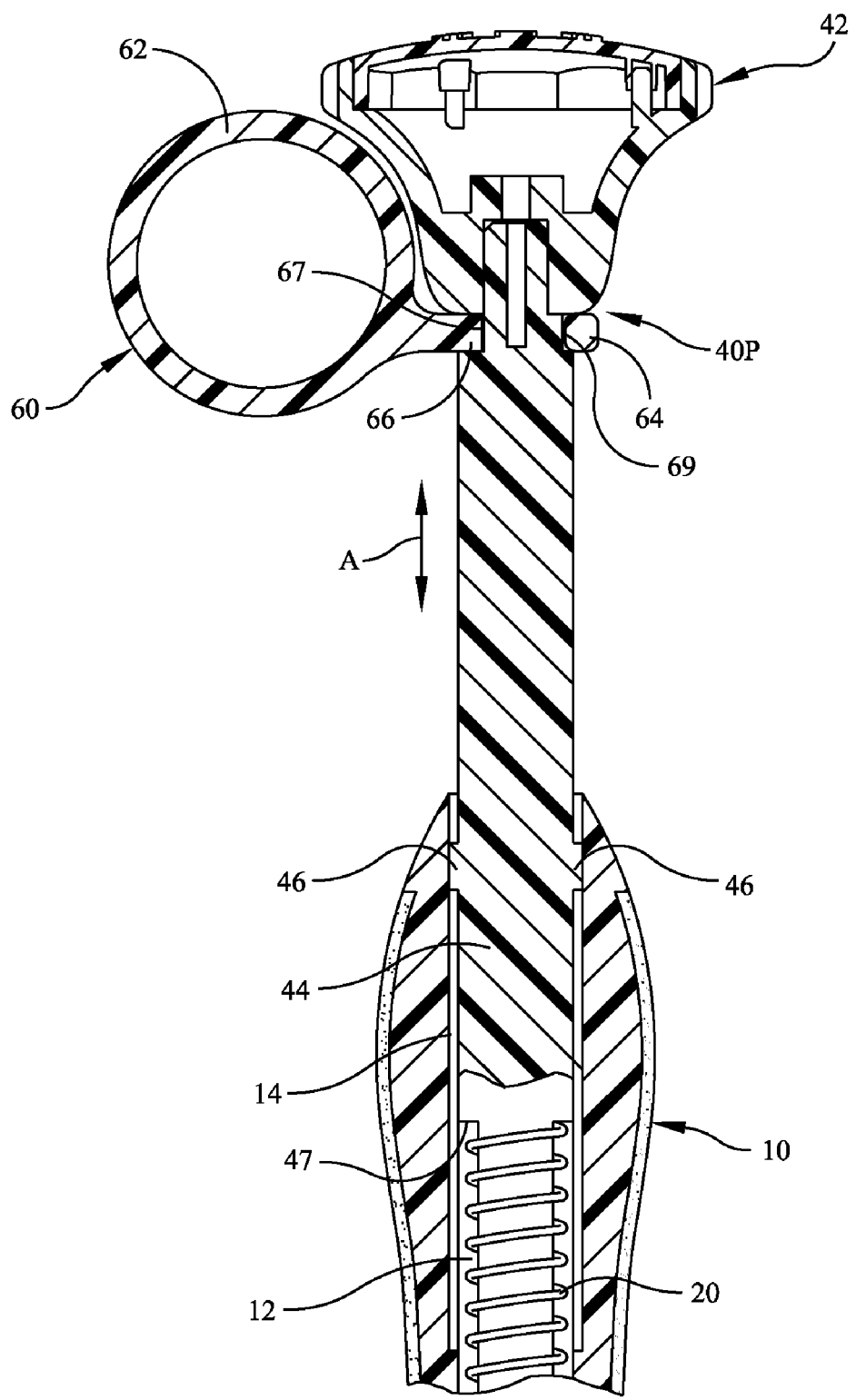
FIG. 15 is an enlarged fragmentary cross-sectional view taken at the proximal end of the device.
Figure 16:
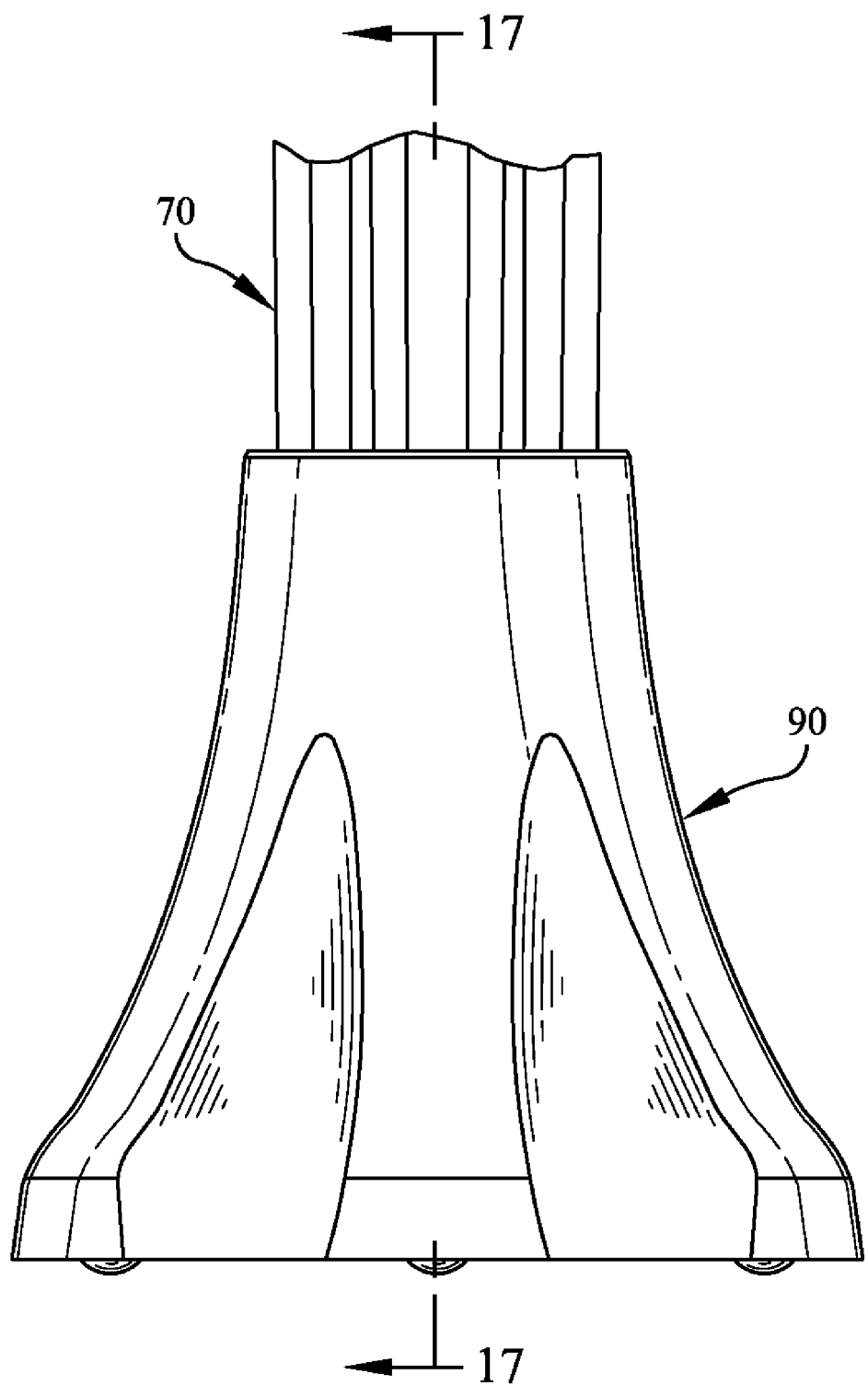
FIG. 16 is a partial side elevation view of the base and cover.
Figure 17:
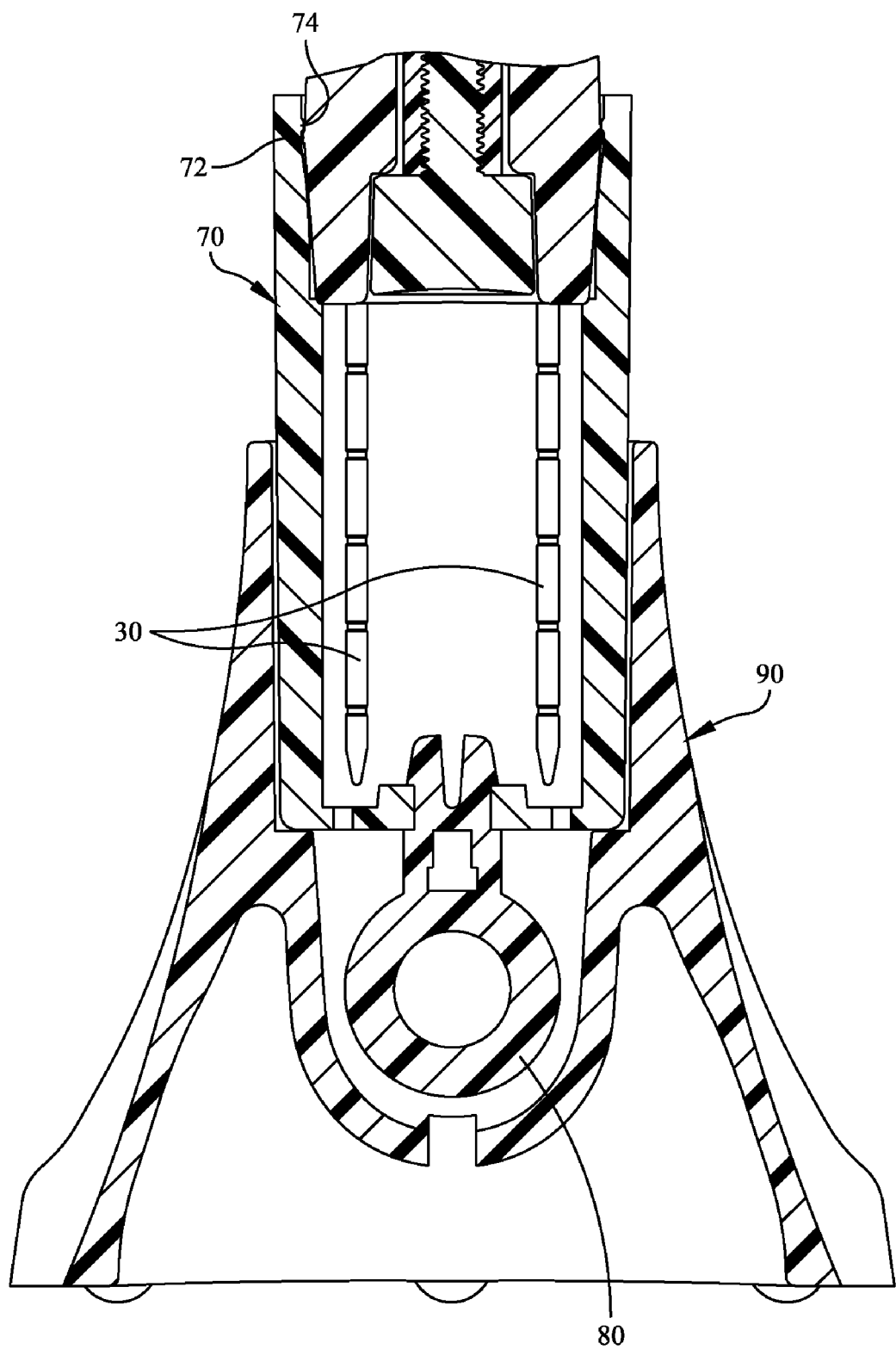
FIG. 17 is a cross-sectional view taken along line 17-17 of FIG. 16.
Figure 18:
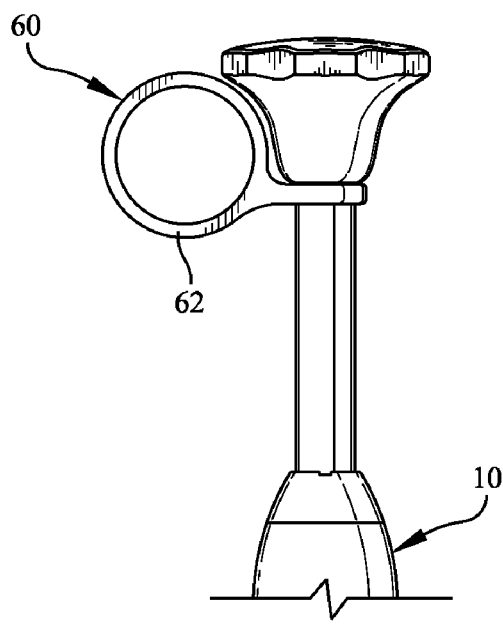
FIGS. 18 and 19 are fragmentary side elevation views at the proximal end of the device and illustrating different respective positions for the eye-ring.
Figure 19:
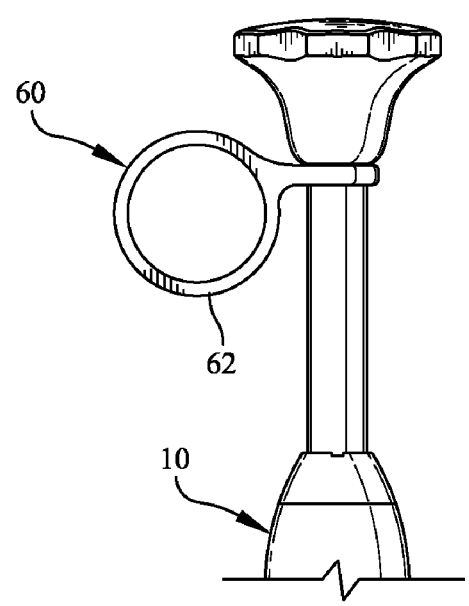

The drawings also illustrate, as in FIG. 5, an eye-ring 60 that is removably attached at the proximal end 40P of the ejector mechanism 40. The eye-ring 60 is disposed adjacent to the proximal end cap 42 and provides a means to assist in operating the ejector mechanism. The eye-ring 60 includes a circular ring 62 and an attachment tab 64 that is preferably integral with the ring 62. It is noted that the attachment tab is disposed offset from the outer surface of the circular ring so as to accommodate different size hands using the device. In this regard refer to FIGS. 18 and 19 that show alternate positions for the eye-ring 60. This enables a re-positioning of the ring to be either close or farther away from the distal end of the device. This is convenient to accommodate different size hands using the device. The attachment tab 64 is fork-shaped as illustrated and is furthermore provided with a ridge 66 that is adapted to engage in a slot in the actuator rod 44. The user can pull the ring 60 from the actuator rod and reverse its position by 180 degrees so that the ring 62 is in either a closer or further position from the end cap 42, as depicted in FIGS. 18 and 19. Refer also to FIGS. 14 and 15 for further details of the manner in which the eye-ring engages with the actuator rod. The deflectable tab 64 thus interlocks with the actuator rod and once interlocked is not rotatable on the actuator rod by the ridge engaging in a slot 67 in the actuator rod. Actually the rod may be provided with an annular groove 69 into which the slot is formed.

The drawings also illustrate a protective cover 70 such as in FIGS. 7-9. This cover 70 is adapted to be inserted over the distal end 10D of the elongated body 10. The cover 70 is adapted to cover the prongs 30 so that they are not in a dangerous position. The cover 70 is preferably engaged with the distal end of the body by a force fit which includes an engagement between an annular ridge 72 extending outwardly at the distal end of the body and engagement with a detent 74. Various types of detent arrangements can be employed for releasably retaining the cover on the body. Refer also to FIG. 9 which shows the bottom ends 75 of the cover that is provided with a series of vent holes 76. The end 75 is also provided with a center hole 77 which receives and supports the eyelet 80. When the cover 70 is engaged with the elongated body, the eyelet 80 may be used for hanging the combined device separate from the base 90.

Figure 2:
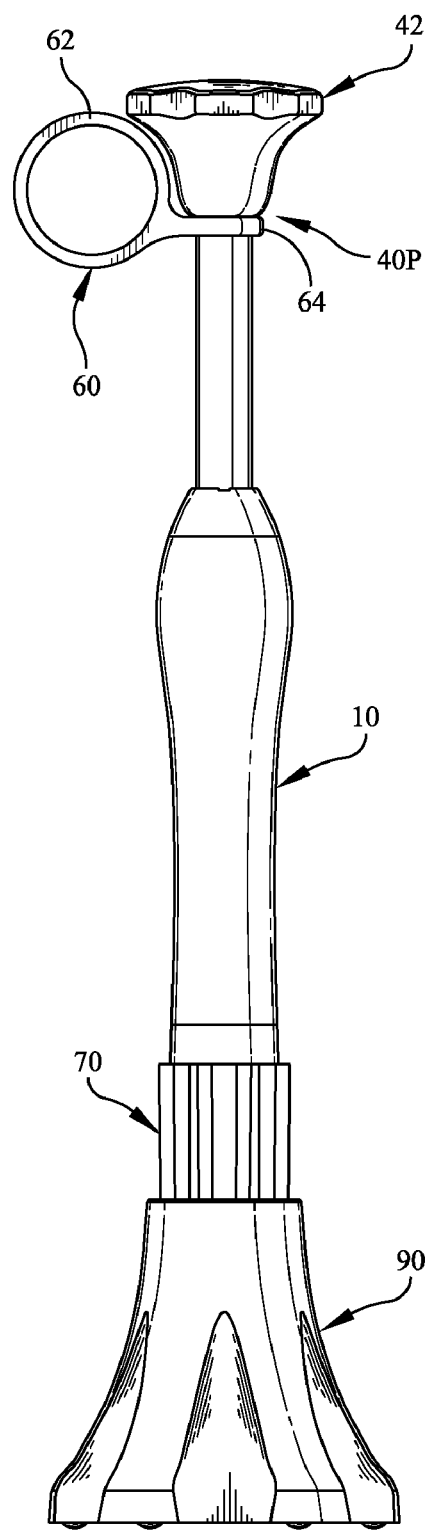
FIG. 2 is a side elevation view of the device of FIG. 1.
Figure 3:
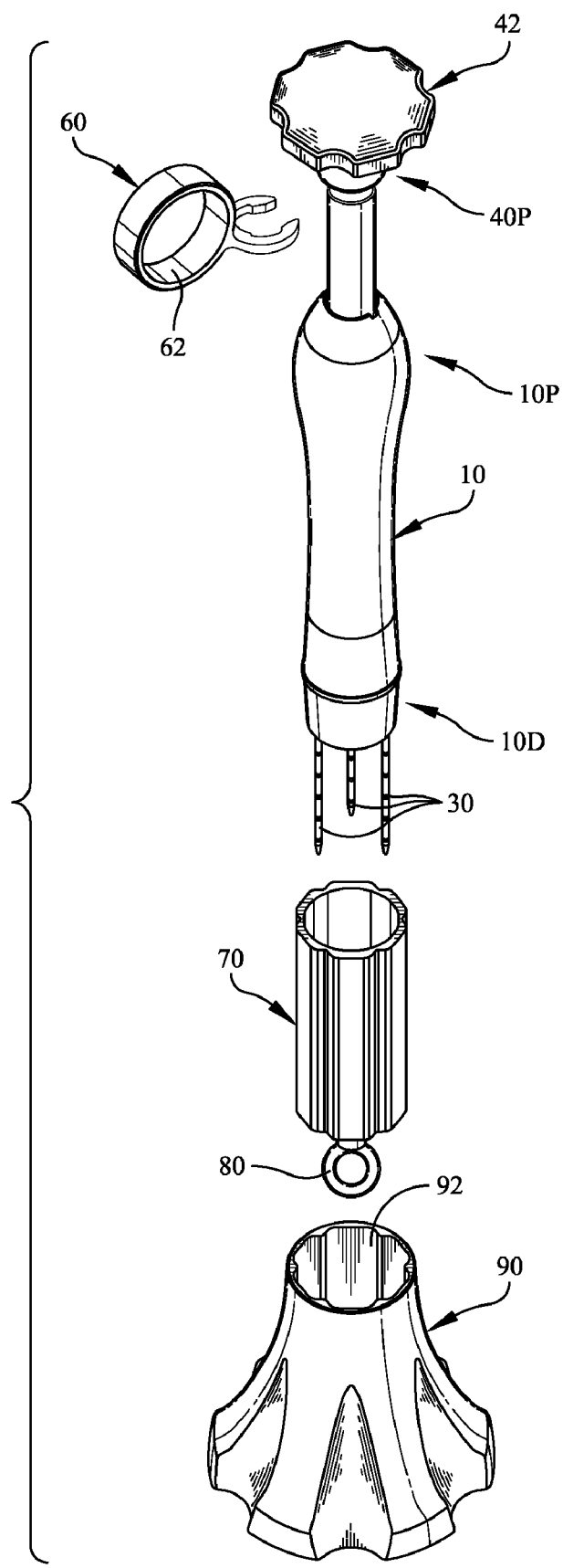
FIG. 3 is an exploded perspective view of the device of FIG. 1.
Figure 4:
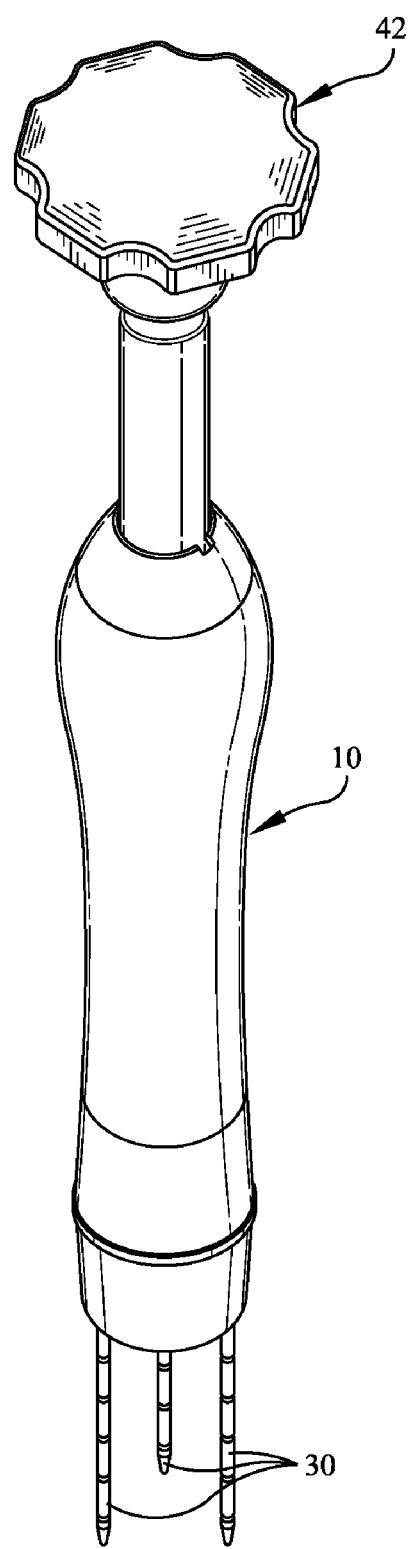
FIG. 4 is a perspective view like that shown in FIG. 1 but without the base or cover.
Figure 6:
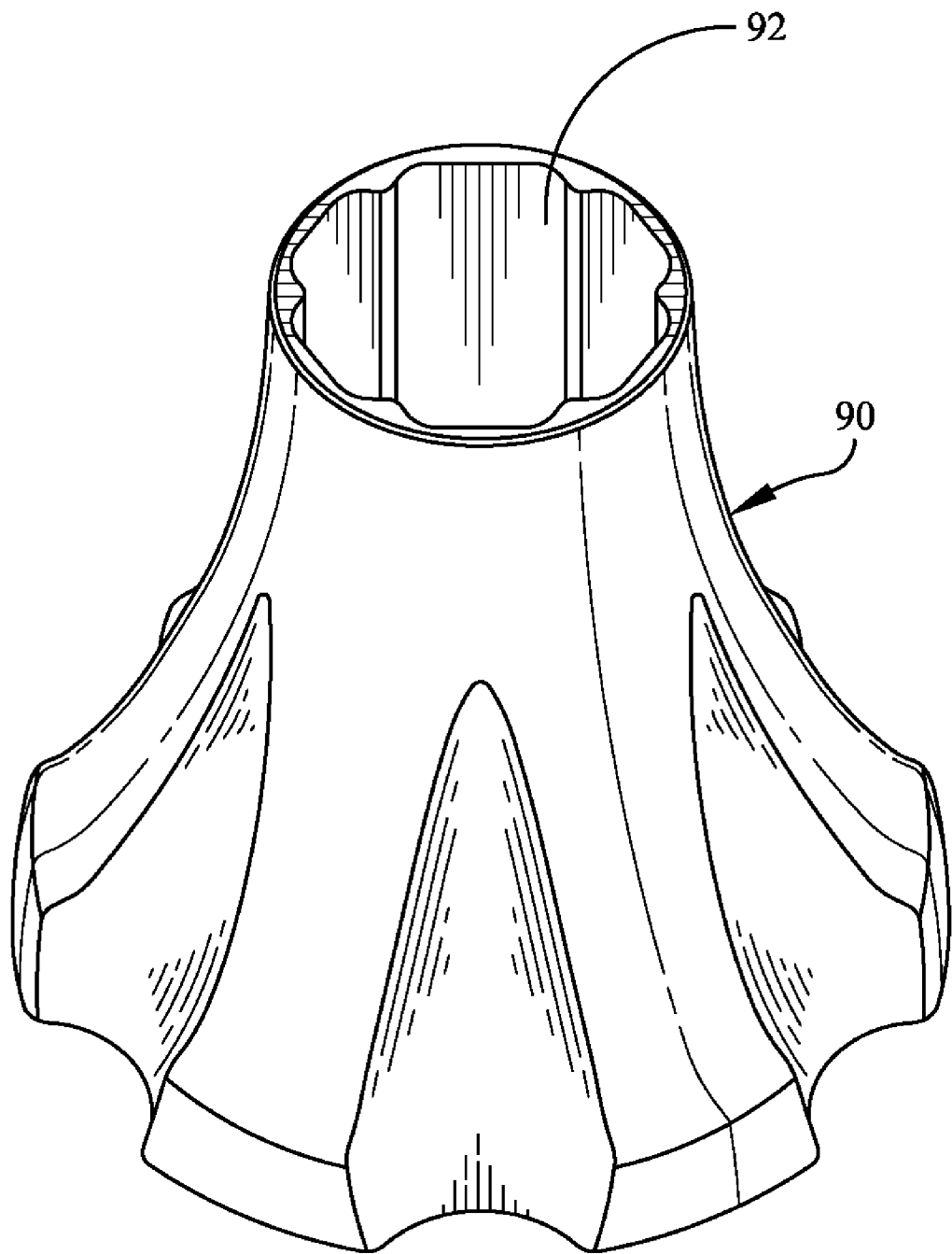
FIG. 6 is a perspective view of the base alone.
Figure 10:
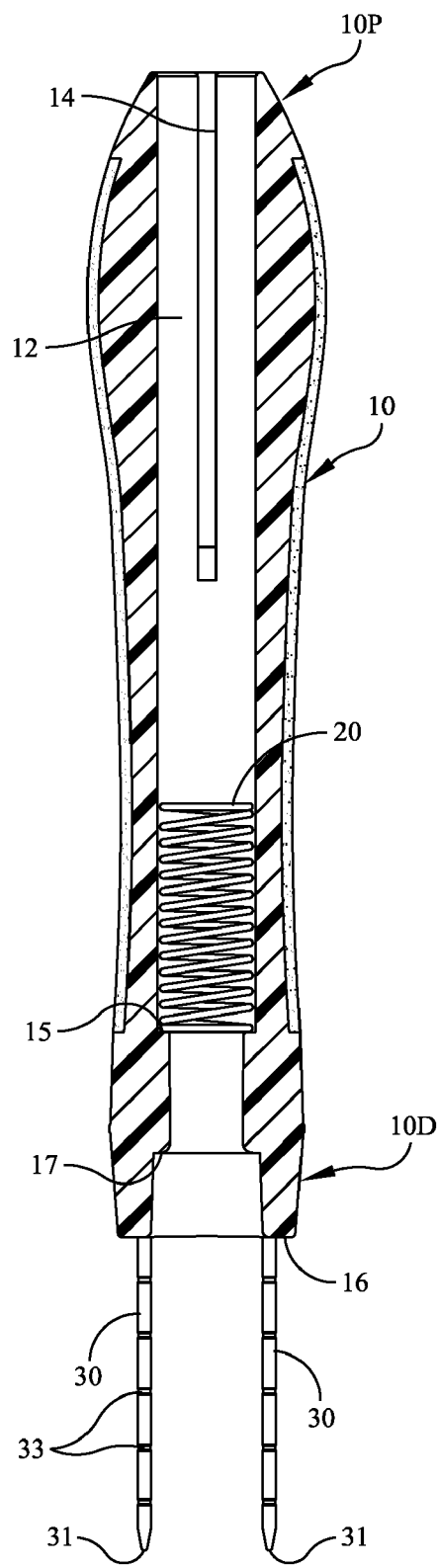
FIG. 10 is a longitudinal cross-sectional view of the device of FIG. 4 without the ejector mechanism.

Finally, there is provided a base 90 which receive the device when the cover is in place, as depicted in FIGS. 1-3. The cover 30 has mating surfaces that engage within the aperture 82 of the base 90, as also depicted in FIGS. 1-3. The base 90 allows the device to be supported in an upright manner as shown in FIG. 1. FIG. 6 is a perspective view of the base 90.

Figure 21:
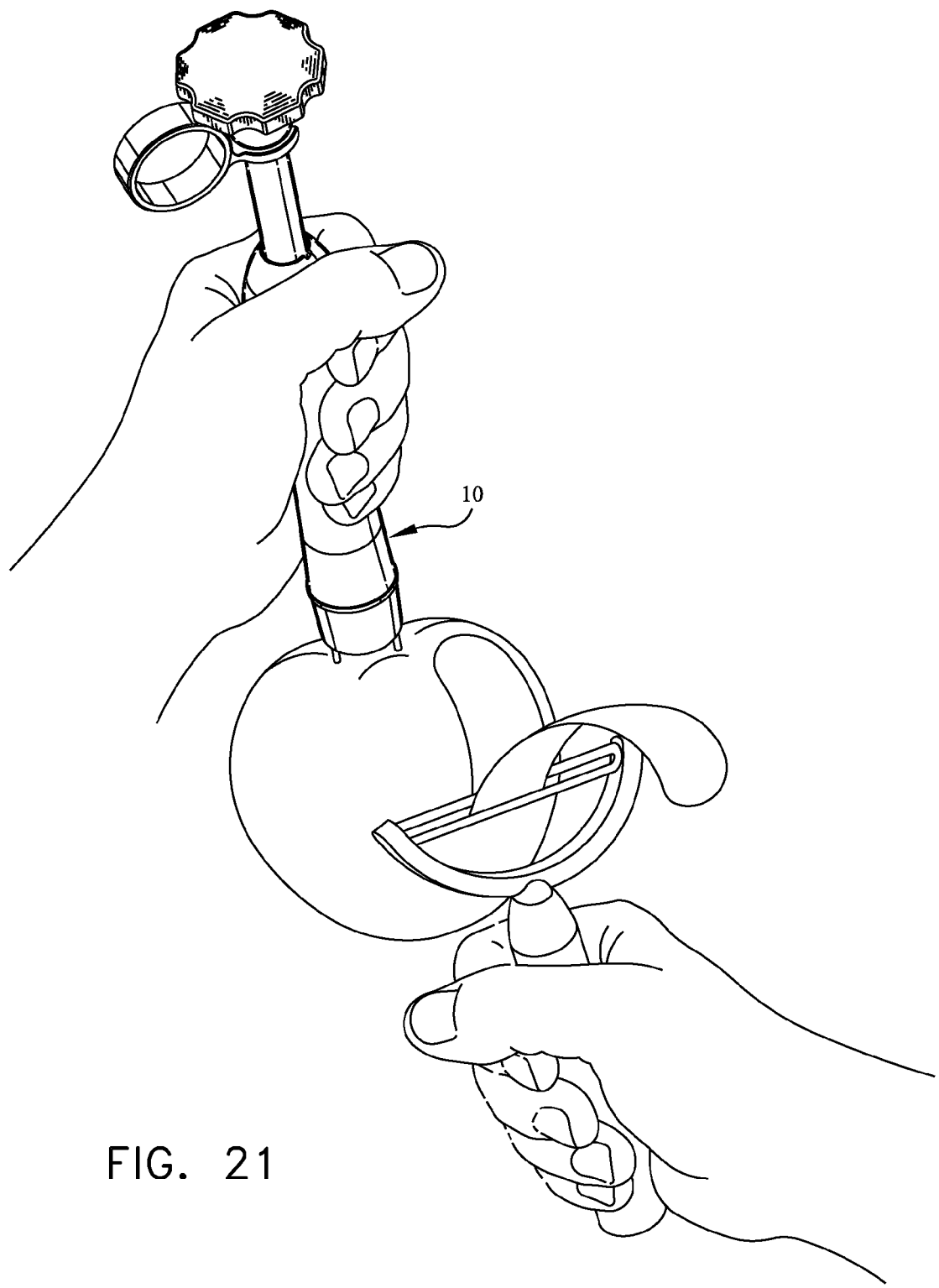
FIG. 21 is a perspective view illustrating a next possible step with the device grasping the apple and being peeled.
Figure 22:
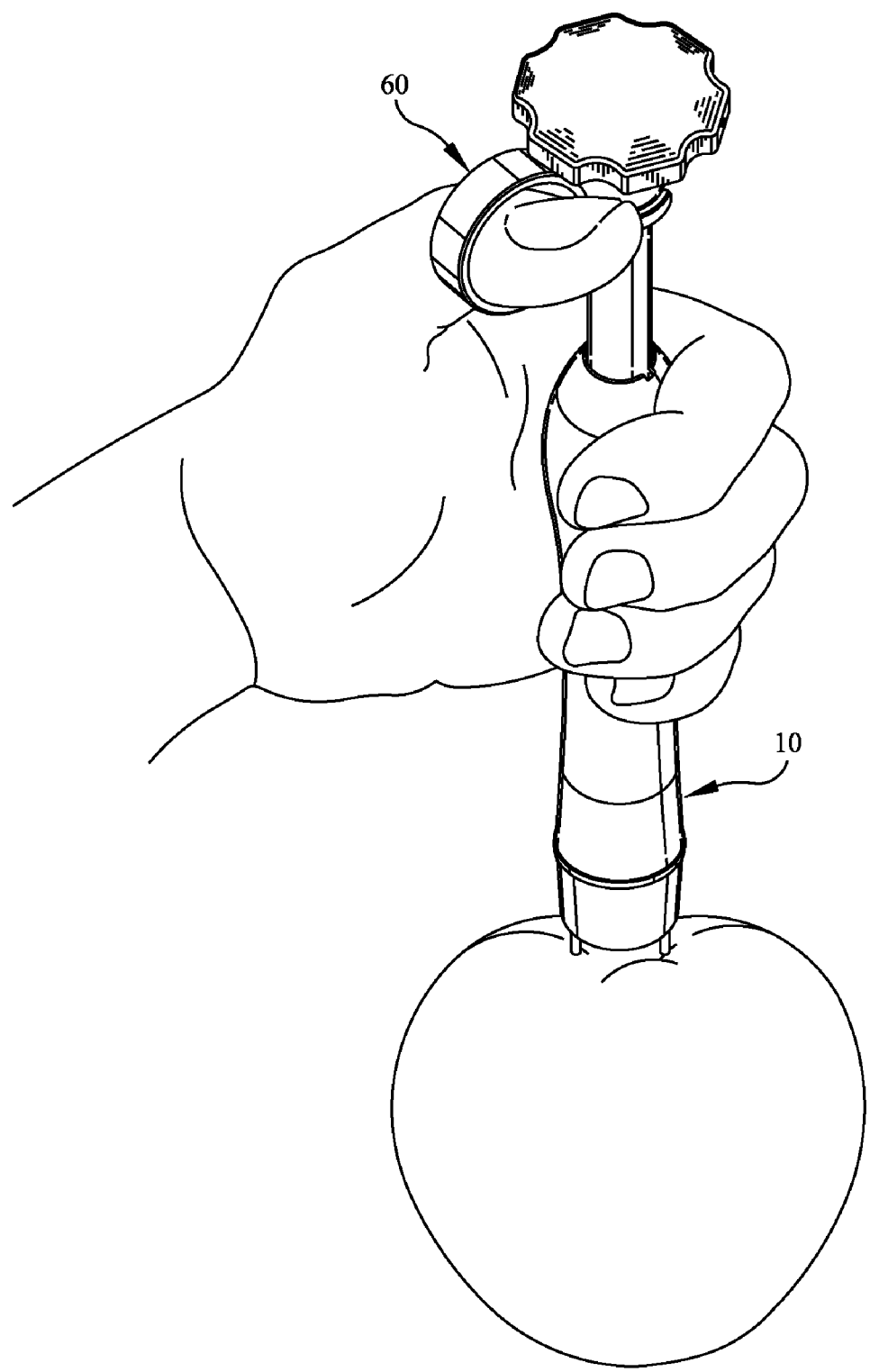
FIG. 22 is a perspective view illustrating a next step of ejecting the apple from the device with the thumb of the user engaging the eye-ring.
Figure 23:
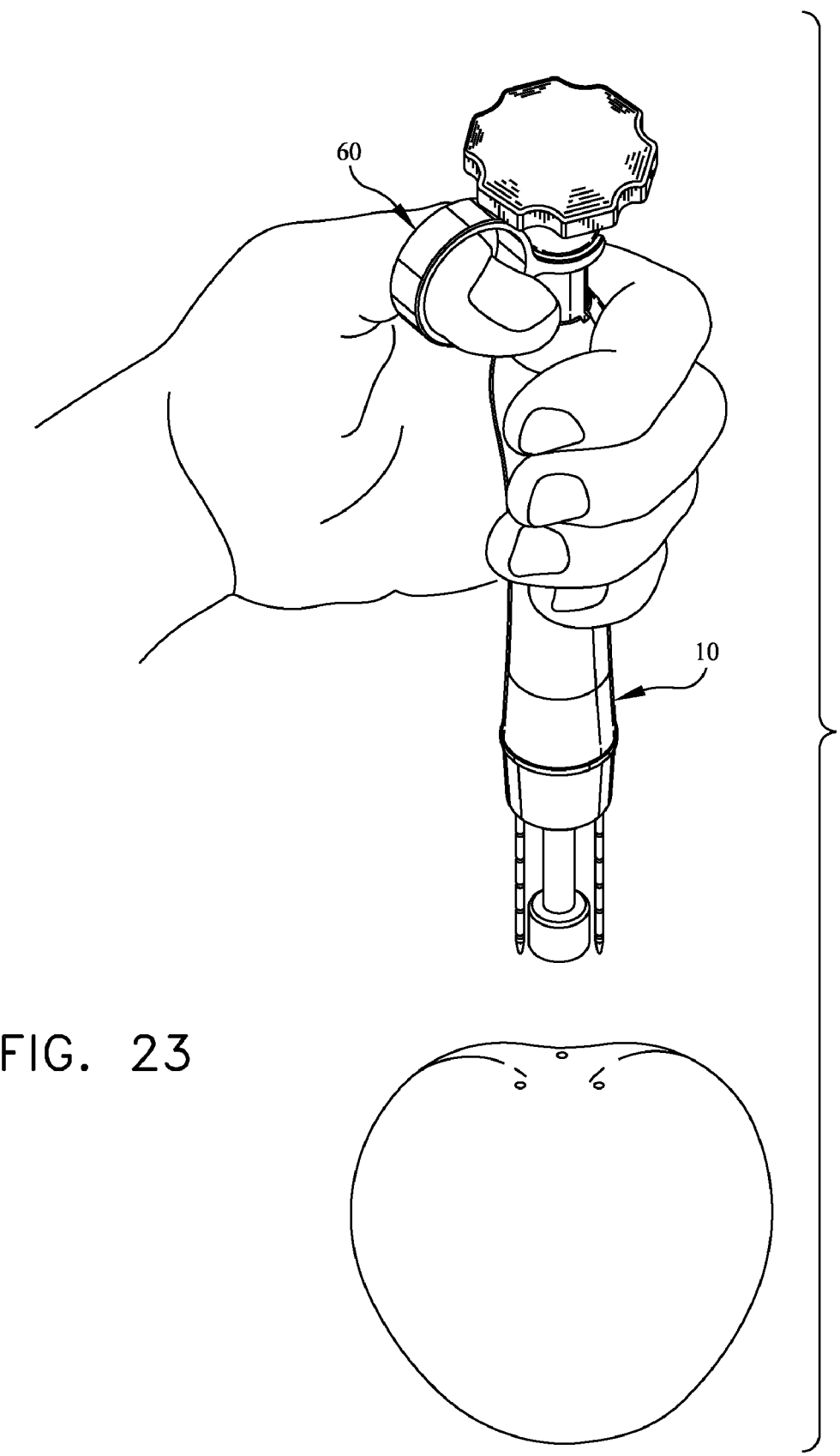
FIG. 23 is a perspective view of a next step where the apple is fully disengaged from the device.

Reference is now made to certain steps that may be taken in using the device of the present invention. FIG. 20 is a perspective view illustrating a first step in using the device of the present invention where the user is grasping the device in readiness for piercing an apple. FIG. 20 shows the prongs about to be pierced into the apple. FIG. 21 is a perspective view illustrating a next possible step with the device holding the apple and being peeled. Thus, one hand is holding the device while the other hand is peeling the apple. FIG. 22 is a perspective view illustrating a next step of ejecting the apple from the device with the thumb of the user engaging the eye-ring. The actuator rod is moved distally causing the pusher member 50 to engage the apple and push the apple away from the prongs. FIG. 23 is a perspective view of a next step where the apple is fully disengaged from the device.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A device for holding an edible product such as a vegetable or fruit in readiness for the preparation thereof, such as for the peeling thereof said device comprising:

an elongated body that is meant to be grasped by a user of the device and held in the hand of the user;

the elongated body having proximal and distal ends with the distal end terminating at a distal annular end surface;

the elongated body further having an elongated and centrally dispose passage extending therethrough from the proximal end to the distal end thereof;

a set of prongs, each having a pointed end, supported by the elongated body, extending from the distal annular end surface of the elongated body and fixed in position relative to the elongated body;

the set of prongs including at least three prongs that are disposed in a parallel array and that are for piercing engagement with the edible product;

adjacent pairs of the at least three prongs constructed and arranged to be disposed in respective predetermined planes that intersect so as to form a multi-sided area therebetween;

an ejector mechanism supported by the elongated body and disposed in the centrally disposed passage in the elongated body;

the ejector mechanism including a proximal end, a distal end and an actuator rod disposed between the proximal and distal ends;

the centrally disposed passage in the elongated body having defined therein at least one elongated slot extending from the proximal end of the elongated body toward the distal end of the elongated body;

the actuator rod having extending radially therefrom at least one key for engaging the elongated slot to enable motion of the actuator rod relative to the elongated body for engaging the edible product while preventing relative rotation between the actuator rod and elongated body;

a proximal end cap arranged at the proximal end of the ejector mechanism and for manual engagement to operate the actuator rod;

a distal pusher piece arranged at the distal end of the ejector mechanism and to engage the edible product only within the multi-sided area for disengagement of the edible product from the set of prongs;

all of said set of prongs along the entire length of each thereof being free of any obstruction including free of the distal pusher piece so that the edible product is fully engaged by the set of prongs;

the distal end of the elongated body having a recess defined in the elongated and centrally dispose passage for receiving the distal pusher piece therein;

said recess formed in, and in part defining, the distal annular end surface;

said actuator rod having a proximal rod section and a distal rod section with the proximal rod section being of greater diameter than the distal rod section so as to define an actuator rod shoulder;

a biasing spring disposed in the centrally disposed passage of the elongated body, about the distal rod section of the actuator rod, having one end thereof supported against the actuator rod shoulder and normally biased for urging the ejector mechanism in a proximal direction wherein the distal pusher piece is held in the recess at the distal end of the elongated body;

and an eye ring attached at the proximal end of the ejector mechanism, adjacent the proximal end cap and provided as a means to assist in operating the ejector mechanism;

the eye ring being removably attached about the actuator rod of the ejector mechanism;

the eye ring being comprised of a circular ring and a fork-shaped attachment tab that is integral with the circular ring but disposed offset extending from an outer surface of the circular ring;

the fork-shaped attachment tab having a ridge for engaging with a slot in the actuator rod so that the eye ring interlocks with and is non-rotatably fixed to the actuator rod;

wherein the ejector mechanism has a withdrawn position and a deployed position, the distal pusher piece is completely nested within the recess in the withdrawn position of the ejector mechanism, the distal pusher piece extends out of the recess in the deployed position of the ejector mechanism, and the recess is constructed and arranged to be open and is defined, at a proximal end thereof, by a shoulder that is greater in diameter than the diameter of the end of the and elongated body passage that is proximal to said recess, and that receives and limits the withdrawn position of the ejector mechanism;

wherein the distal pusher piece has a free end edible product contact face surface for contact with the edible product at least when the edible product is engaged so as to release the edible product away from the prongs, the complete distal pusher piece being disposed within the recess in the withdrawn position of the ejector mechanism;

and wherein the annular end surface at the distal end of the elongated body is substantially flat and the contact face surface of the distal pusher piece is substantially flat and is flush with the substantially flat annular end surface at the distal end of the elongated body when the actuator rod assembly is in the withdrawn position while the proximal end face of the distal pusher piece is engaged against the recess shoulder in the withdrawn position.

2. The device of claim 1 wherein said at least one slot comprises a pair of diametrically disposed slots in the centrally disposed passage in the elongated body, and said at least on key comprises a pair of diametrically disposed keys for respectively engaging the pair of diametrically disposed slots.

3. The device of claim 1 wherein the actuator rod has an annular groove into which the slot in the actuator rod is formed.

4. The device of claim 3 wherein the eye ring is removably attached so as to assume two separate positions, one position in which the eye ring is closer to the prongs and another position in which the eye ring is farther from the prongs.

5. The device of claim 4 wherein the fork-shaped attachment tab has curved legs defining an opening, the ridge directed toward the opening and the legs engaged with the annular groove.

6. The device of claim 1 wherein all of the prongs of the set of prongs has a pointed end and an opposite end imbedded in the distal end of the elongated body and a series of spacedly disposed engagement grooves are disposed about all prongs to assist in holding the edible product to the prongs.

7. The device of claim 1 wherein the distal end of the body is circular; the set of prongs extend from the annular end surface and the at least three prongs are arranged in a triangular pattern extending equally spaced from and about the annular end surface.

8. The device of claim 2 including a cover that fits over the set of prongs and fits with the distal end of the elongated body.

9. The device of claim 8 in combination with a base that supports the cover when the cover is engaged with the distal end of the elongated body.

* * * * *